United States Patent
Aggarwal

(10) Patent No.: US 11,170,285 B2
(45) Date of Patent: Nov. 9, 2021

(54) VIRTUAL ASSISTANT CONFIGURED TO RECOMMENDED ACTIONS IN FURTHERANCE OF AN EXISTING CONVERSATION

(71) Applicant: Google Inc., Mountain View, CA (US)

(72) Inventor: Vikram Aggarwal, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 1025 days.

(21) Appl. No.: 15/588,055

(22) Filed: May 5, 2017

(65) Prior Publication Data
US 2018/0322380 A1    Nov. 8, 2018

(51) Int. Cl.
| | | |
|---|---|---|
| G06N 3/00 | (2006.01) | |
| G06N 5/04 | (2006.01) | |
| G06N 20/00 | (2019.01) | |
| G06Q 10/10 | (2012.01) | |

(52) U.S. Cl.
CPC .............. *G06N 3/006* (2013.01); *G06N 5/04* (2013.01); *G06N 20/00* (2019.01); *G06Q 10/10* (2013.01)

(58) Field of Classification Search
CPC ......... G06Q 10/10; H04L 51/02; G10L 15/22; G06N 5/02; G06N 5/04; G06N 3/006; G06N 20/00
See application file for complete search history.

(56) References Cited

U.S. PATENT DOCUMENTS

| | | | |
|---|---|---|---|
| 9,008,629 B1* | 4/2015 | Masterman | H04W 52/0251 455/412.2 |
| 9,275,641 B1 | 3/2016 | Gelfenbeyn et al. | |
| 2013/0311997 A1 | 11/2013 | Gruber et al. | |
| 2015/0358414 A1 | 10/2015 | Mehta et al. | |
| 2016/0335138 A1 | 11/2016 | Surti et al. | |
| 2016/0360336 A1* | 12/2016 | Gross | H04M 1/72403 |
| 2016/0379105 A1* | 12/2016 | Moore, Jr. | G06F 21/316 706/11 |

(Continued)

FOREIGN PATENT DOCUMENTS

| | | |
|---|---|---|
| WO | 2012092654 | 7/2012 |
| WO | 2017059388 | 4/2017 |

OTHER PUBLICATIONS

International Search Report and Written Opinion of PCT Ser. No. PCT/US2018/030635 dated Jun. 19, 2018.

(Continued)

*Primary Examiner* — Benjamin P Geib
(74) *Attorney, Agent, or Firm* — Middleton Reutlinger

(57) ABSTRACT

A system is described that determines, based on information associated with a user of a computing device, an event for initiating an interaction between the user and an assistant executing at the computing device. The system selects, based on the event and from a plurality of actions performed by the assistant, at least one action associated with the event. The system determines, based on the at least one action, whether to output a notification of the event which includes an indication of the event and a request to perform the at least one action associated with the event. Responsive to determining to output the notification of the event, the system sends, to the assistant, the notification of the event for output during the interaction between the user and the assistant.

8 Claims, 4 Drawing Sheets

(56) References Cited

U.S. PATENT DOCUMENTS

2017/0091612 A1* 3/2017 Gruber .................. G06F 40/169
2017/0357480 A1* 12/2017 La Placa ................ C12Q 1/001
2018/0013844 A1* 1/2018 Foged .................. G06N 3/0454

OTHER PUBLICATIONS

Amazon, "Alexa Skills," retrieved from: https://www.amazon.com/b?ie=UTF8&node=13727921011 on Jan. 26, 2017, 3 pp.

API.AI, "Build Conversation Actions for Google Assistant Users," retrieved from: https://api.ai/blog/2016/12/08/build-conversation-actions-for-the-google-assistant/, Dec. 8, 2016, 2 pp.

Badcock, "First Alexa Third-Party Skills Now Available for Amazon Echo," retrieved from: https://developer.amazon.com/blogs/post/TxC2VHKFEIZ9SG/first-alexa-third-party-skills-now-available-for-amazon-echo, Aug. 17, 2015, 5 pp.

Newman, "It's On! 2017 is the Year The Virtual Assistant Wars Get Real," retrieved from: https://www.fastcompany.com/3066831/its-on-2017-is-the-year-the-virtual-assistant-wars-get-real, Dec. 28, 2016, 9 pp.

U.S. Appl. No. 15/381,544, by Aggarwal et al., filed Dec. 16, 2016.

European Patent Office; Examination Report issued for Application No. 18726635.8 dated Oct. 14, 2020.

Japan Patent Office: Office Action issued for Application No. 2019-560298 dated Nov. 11, 2020.

Japanese Patent Office; Notice of Allowance issued for Application No. 2019-560298; 3 pages; dated Jun. 7, 2021.

Intellectual Property India; Office Action issued in Application No. 201927043966; 6 pages; dated Jun. 25, 2021.

\* cited by examiner

VIRTUAL ASSISTANT CONFIGURED TO RECOMMENDED ACTIONS IN FURTHERANCE OF AN EXISTING CONVERSATION

BACKGROUND

Some computing platforms may provide a user interface from which a user can chat, speak, or otherwise communicate with a virtual, computational assistant (e.g., also referred to as "an intelligent personal assistant" or simply as an "assistant") to cause the assistant to output information, respond to a user's needs, or otherwise perform certain operations to help the user complete a task. While some assistants may be quite sophisticated and configured to perform a variety of real-world or virtual tasks, a user may not always be aware of all the capabilities that an assistant provides. A user may only request information or cause the assistant to perform certain tasks that the user knows that the assistant can handle.

SUMMARY

In general, techniques of this disclosure may enable an assistant to output information about one or more additional actions that the assistant may initiate in furtherance of an existing conversation with a user without requiring the user to solicit the assistant for such information. That is, the assistant may proactively guide the user to additional capabilities of the assistant that are related to an existing conversation with the user, even in instances where there was no explicit user request for such information. For example, once the assistant has received permission to maintain or have access to information associated with a user, the assistant may determine, based on the user information, that a departure time of a flight reservation for the user is delayed. In addition to generating output notifying the user about the flight delay, and without receiving user input, the assistant may generate additional output that offers to reschedule a dinner reservation or ground transportation to accommodate the delay. In this way, the assistant is configured to output initiate a dialogue, output additional information, or output related offers to perform additional actions (e.g., rescheduling dinner or ground transportation) in furtherance of an existing conversation with the user. Accordingly, the described techniques may improve usability with an assistant by reducing the quantity of user inputs required for a user to discover, and cause the assistant to perform, various actions.

In one example, the disclosure is directed to a method that includes determining, based on information associated with a user of a computing device, an event for initiating an interaction between the user and an assistant executing at the computing device, wherein the assistant is configured to perform a plurality of actions, selecting, based on the event and from the plurality of actions, at least one action associated with the event, and determining, based on the at least one action, whether to output a notification of the event, wherein the notification includes an indication of the event and a request to perform the at least one action associated with the event. The method further includes responsive to determining to output the notification of the event, sending, to the assistant, the notification of the event for output during the interaction between the user and the assistant.

In another example, the disclosure is directed to a computing device that includes: an output device, at least one processor, and at least one memory. The memory includes instructions that when executed, cause the at least one processor to execute an assistant configured to: determine, based on information associated with a user of the computing device, an event for initiating an interaction between the user and the assistant, wherein the assistant is configured to perform a plurality of actions, select, based on the event and from the plurality of actions, at least one action associated with the event, determine, based on the at least one action, whether to output a notification of the event wherein the notification includes an indication of the event and a request to perform the at least one action associated with the event, and responsive to determining to output the notification of the event, output, via the output device, the notification of the event during the interaction between the user and the assistant.

In another example, the disclosure is directed to a computer-readable storage medium comprising instructions that, when executed cause at least one processor of a digital assistant system to: determine, based on information associated with a user of a computing device, an event for initiating an interaction between the user and an assistant executing at the computing device, wherein the assistant is configured to perform a plurality of actions, select, based on the event and from the plurality of actions, at least one action associated with the event, and determine, based on the at least one action, whether to output a notification of the event, wherein the notification includes an indication of the event and a request to perform the at least one action associated with the event. The instructions, when executed, further cause the at least one processor of the digital assistant system to responsive to determining to output the notification of the event, send, to the assistant, the notification of the event for output during the interaction between the user and the assistant.

In another example, the disclosure is directed to a system including means for determining, based on information associated with a user of a computing device, an event for initiating an interaction between the user and an assistant executing at the computing device, wherein the assistant is configured to perform a plurality of actions, means for selecting, based on the event and from the plurality of actions, at least one action associated with the event, and means for determining, based on the at least one action, whether to output a notification of the event, wherein the notification includes an indication of the event and a request to perform the at least one action associated with the event. The system further includes means for responsive to determining to output the notification of the event, sending, to the assistant, the notification of the event for output during the interaction between the user and the assistant.

The details of one or more examples are set forth in the accompanying drawings and the description below. Other features, objects, and advantages of the disclosure will be apparent from the description and drawings, and from the claims.

DETAILED DESCRIPTION

Figure 1:
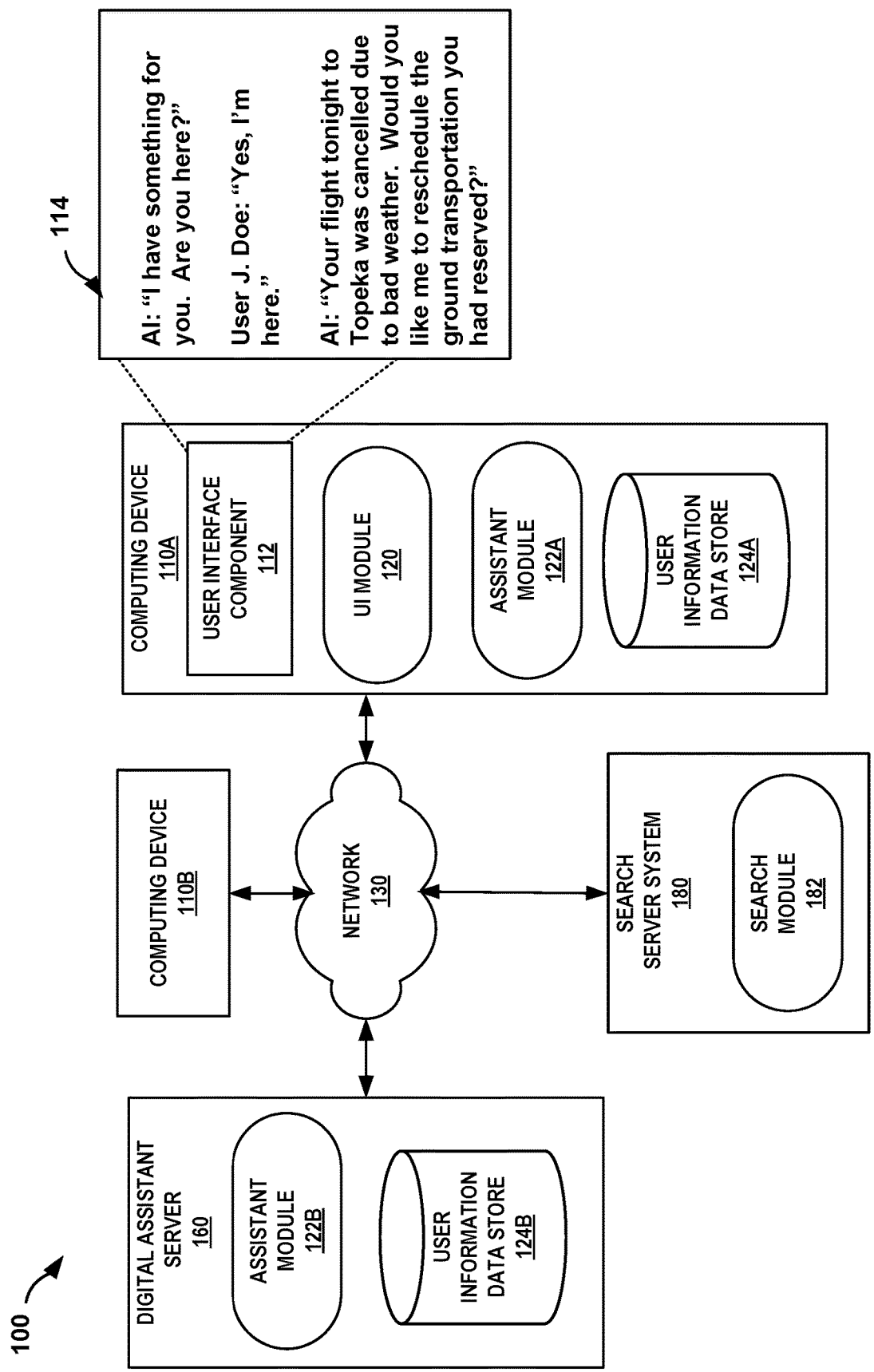
FIG. 1 is a conceptual diagram illustrating an example system that executes an example virtual assistant, in accordance with one or more aspects of the present disclosure.

FIG. 1 is a conceptual diagram illustrating an example system that executes an example virtual assistant, in accordance with one or more aspects of the present disclosure. System 100 of FIG. 1 includes digital assistant server 160 in communication, via network 130, with search server system 180 and computing devices 110A and 110B (collectively, computing devices 110). Although system 100 is shown as being distributed amongst digital assistant server 160, search server system 180, and computing devices 110, in other examples, the features and techniques attributed to system 100 may be performed internally, by local components of computing devices 110. Similarly, digital assistant server 160 may include certain components and perform various techniques that are otherwise attributed in the below description to search server system 180 and/or computing devices 110. Although FIG. 1 illustrates two computing devices 110, any suitable number of one or more computing devices 110 may be used.

Network 130 represents any public or private communications network, for instance, cellular, Wi-Fi, and/or other types of networks, for transmitting data between computing systems, servers, and computing devices. Digital assistant server 160 may exchange data, via network 130, with computing devices 110 to provide a virtual assistant service that is accessible to computing devices 110 when computing devices 110 are connected to network 130. Digital assistant server 160 may exchange data, via network 130, with search server system 180 to access a search service provided by search server system 180. Computing devices 110 may exchange data, via network 130, with search server system 180 to access the search service provided by search server system 180.

Network 130 may include one or more network hubs, network switches, network routers, or any other network equipment, that are operatively inter-coupled thereby providing for the exchange of information between server systems 160 and 180 and computing devices 110. Computing devices 110, digital assistant server 160, and search server system 180 may transmit and receive data across network 130 using any suitable communication techniques. Computing devices 110, digital assistant server 160, and search server system 180 may each be operatively coupled to network 130 using respective network links. The links coupling computing devices 110, digital assistant server 160, and search server system 180 to network 130 may be Ethernet or other types of network connections and such connections may be wireless and/or wired connections.

Digital assistant server 160 and search server system 180 represent any suitable remote computing systems, such as one or more desktop computers, laptop computers, mainframes, servers, cloud computing systems, etc. capable of sending and receiving information both to and from a network, such as network 130. Digital assistant server 160 hosts (or at least provides access to) a virtual assistant service. Search server system 180 hosts (or at least provides access to) a search service. In some examples, digital assistant server 160 and search server system 180 represent cloud computing systems that provide access to their respective services via a cloud.

Computing devices 110 represent individual mobile or non-mobile computing devices that are configured to access the virtual assistant service provided via network 130. Examples of computing devices 110 include a mobile phone, a tablet computer, a laptop computer, a desktop computer, a server, a mainframe, a set-top box, a television, a wearable device (e.g., a computerized watch, computerized eyewear, computerized gloves, etc.), a home automation device or system (e.g., an intelligent thermostat or security system), a voice-interface or countertop home assistant device, a personal digital assistants (PDA), a gaming system, a media player, an e-book reader, a mobile television platform, an automobile navigation or infotainment system, or any other type of mobile, non-mobile, wearable, and non-wearable computing device configured to execute or access a virtual assistant and receive information via a network, such as network 130.

Computing devices 110 may communicate with digital assistant server 160 and/or search server system 180 via network 130 to access the virtual assistant service provided by digital assistant server 160 and/or to access the search service provided by search server system 180. In the course of providing virtual assistant services, digital assistant server 160 may communicate with search server system 180 to obtain information needed for completing a task.

In the example of FIG. 1, digital assistant server 160 includes assistant module 122B and user information data store 124B. Computing device 110A includes user interface component (UIC) 112, user interface (UI) module 120, assistant module 122, and user information data store 124A. Search server system 180 includes search module 182. Although not shown, computing device 110B may include similar components and/or modules as computing device 110A.

Modules 120, 122A, 122B, and 182 may perform operations described using software, hardware, firmware, or a mixture of hardware, software, and firmware residing in and/or executing at one of computing device 110A, digital assistant server 160, or search server system 180. Computing device 110A, digital assistant server 160, and search server system 180 may execute modules 120, 122A, 122B, and 182 with multiple processors or multiple devices. Computing device 110A, digital assistant server 160, and search server system 180 may execute modules 120, 122A, 122B, and 182 as virtual machines executing on underlying hardware. Modules 120, 122A, 122B, and 182 may execute as one or more services of an operating system or computing platform. Modules 120, 122A, 122B, and 182 may execute as one or more executable programs at an application layer of a computing platform.

UIC 112 of computing devices 110 may function as an input and/or output device for computing device 110A. UIC 112 may be implemented using various technologies. For instance, UIC 112 may function as an input device using presence-sensitive input screens, microphone technologies, infrared sensor technologies, cameras, or other input device technology for use in receiving user input. UIC 112 may function as output device configured to present output to a user using any one or more display devices, speaker technologies, haptic feedback technologies, or other output device technology for use in outputting information to a user.

UI module 120 may manage user interactions with UIC 112 and other components of computing device 110A and may interact with digital assistant server 160 so as to provide assistant services via UIC 112. UI module 120 may cause UIC 112 to output a user interface as a user of computing device 110A views output and/or provides input at UIC 112. For example, as shown in FIG. 1, UI module 120 may send instructions to UIC 112 that cause UIC 112 to display user interface 114 at a display screen of UIC 112.

User interface 114 includes text of a conversation between a user of computing device 110A and an assistant provided by assistant module 122A. In the example of FIG. 1, user interface 114 is a graphical user interface. User interface 114 may in some examples be an audible user interface. User interface 114 may include virtual assistant information in various forms such as audible sound, vibrations, text, graphics, content cards, images, etc.

UI module 120 and UIC 112 may receive one or more indications of input (e.g., voice input, touch input, non-touch or presence-sensitive input, video input, audio input, etc.) from a user as the user interacts with user interface 114, at different times and when the user and computing device 110A are at different locations. UI module 120 and UIC 112 may interpret inputs detected at UIC 112 and may relay information about the inputs detected at UIC 112 to assistant module 122A and/or one or more other associated platforms, operating systems, applications, and/or services executing at computing device 110A, for example, to cause computing device 110A to perform functions.

UI module 120 may receive information and instructions from one or more associated platforms, operating systems, applications, and/or services executing at computing device 110A and/or one or more remote computing systems, such as server systems 160 and 180. In addition, UI module 120 may act as an intermediary between the one or more associated platforms, operating systems, applications, and/or services executing at computing device 110A, and various output devices of computing device 110A (e.g., speakers, LED indicators, audio or haptic output device, etc.) to produce output (e.g., a graphic, a flash of light, a sound, a haptic response, etc.) with computing device 110A. For example, UI module 120 may cause UIC 112 to output user interface 114 based on data UI module 120 receives via network 130 from digital assistant server 160. UI module 120 may receive, as input from digital assistant server 160 and/or assistant module 122A, information (e.g., audio data, text data, image data, etc.) and instructions for presenting as user interface 114.

Assistant module 122A and assistant module 122B may collaboratively maintain user information data stores 124A and 124B as part of a virtual assistant service accessed via computing devices 110. Assistant module 122B and user information data store 124B represent server-side or cloud implementations of an example assistant whereas assistant module 122A and user information data store 124A represent a client-side or local implementation of the example assistant. In some examples, some or all the functionality attributed to assistant module 122A may be performed by assistant module 122B, and vice versa.

Referred to collectively as assistant modules 122, assistant module 122A and assistant module 122B may execute an assistant that is configured to proactively direct, automatically and without requiring user interactions, a user of a computing device to meaningful or otherwise useful information that the user may be interested in at a current time. Assistant modules 122 may be configured to output information about one or more additional actions that the assistant is configured to perform in furtherance of an existing conversation with a user, without requiring the user to solicit the assistant for such information. That is, the assistant provided by assistant modules 122 may proactively guide a user to additional capabilities of the assistant that are related to an existing conversation with the user, even in instances where there was no explicit user request for the such information.

Assistant modules 122 may each include software agents configured to execute as intelligent personal assistants that can perform tasks or services for an individual, such as a user of computing devices 110. Assistant modules 122 may perform these tasks or services based on: user input (e.g., detected at UIC 112), context awareness (e.g., based on location, etc.), and/or an ability to access other information (e.g., weather or traffic conditions, news, stock prices, sports scores, user schedules, transportation schedules, retail prices, etc.) from a variety of information sources (e.g., either stored locally at computing devices 110, digital assistant server 160, or obtained via the search service provided by search server system 180, including push notification services). Assistant modules 122 may perform artificial intelligence and/or machine learning techniques to automatically identify and complete one or more tasks on behalf of a user. Assistant modules 122 may rely on other applications (e.g., third-party applications), services, or other devices (e.g., televisions, automobiles, watches, home automation systems, entertainment systems, etc.) to perform the one or more tasks.

After receiving explicit user consent, assistant modules 122 may, e.g., in the course of executing operations to support conversations with a user of computing devices 110, automatically maintain information associated with a user, or pointers to locations of information associated with a user (e.g., stored by information sources located at computing devices 110, server systems 160 or 180, or by any other server or device located elsewhere on network 130). Assistant modules 122 may maintain the information, or pointers to information, associated with the user as user information data stores 124A and 124B (collectively "user information data stores 124"). Data stores 124 may enable the assistant executed by assistant modules 122 to quickly access user information required by the assistant to complete a real-world task, a virtual task, or otherwise respond to immediate and/or future needs of the user of computing devices 110.

For example, information associated with a user may be information obtained, with permission from the user, during a conversation between the user and the assistant, calendar information, contact information, user interests, user preferences, and any other information associated with a user that may be used by assistant modules 122 to proactively direct the user to meaningful information. Examples of sources of information associated with the user may include, but are not limited to, intelligence built in an e-mail system, user interactions with assistant modules 122, user interactions and application usage on devices associated with the user (e.g., computing devices 110), or other sources of information.

The term "conversation" as used throughout this specification refers to regular interactions between a user of a computing device and an assistant executing at or accessible from the computing device as opposed to interactions that might occur during initial set up, installation, first time use, etc. In other words, the conversation occurs during everyday use of the assistant, by the user, as the user is performing a task other than setting up the assistant. Conversation as used herein does not refer to a user answering questions as part setting up an app or providing information for populating preset fields of a user interface.

In operation, assistant modules 122 may provide an assistant that executes at, or is accessible from, computing devices 110. The assistant may be configured to initiate a conversation or start a dialog with a user, ask the user for information, and suggest actions that the assistant may perform on behalf of the user even if the user is not aware of the actions. The assistant may be configured to recommend to the user a valuable action that is related to an existing conversation with the user, without the user explicitly asking for it. For example, assistant module 122B may determine whether to start a dialog with a user and choose the dialog to start. Assistant module 122B may cause assistant module 122A to initiate the dialog and obtain user authorization for assistant module 122A to perform an action that is related to the dialog.

Assistant modules 122 may determine, based on information associated with a user of computing device 110, events for triggering interactions (e.g., conversations or dialogues) between the user of computing device 110 and assistants executing at computing devices 110. Assistant modules 122 may only analyze information associated with computing devices 110 and/or a user of computing device 110s if the user affirmatively consents to use or collection of such information. Assistant modules 122 may further provide opportunities for the user to withdraw consent and in which case, assistant modules 122 may cease collecting or otherwise retaining the information associated with computing devices 110 or the user of computing devices 110. Assistant modules 122 may analyze a user's personal information (e.g., data stores 124) including but not limited to: search history and online interactions, previous interactions with the assistant (e.g., "call mom", "call Kathy"), and interactions with other applications and third party entities executing at or accessible from computing devices 110. Assistant module 122B may be aware of which "surface" or device from which a user is more likely to interact with the assistant at any given time and send notifications of events to that particular surface.

For example, after assistant modules 122 have received, from a user, permission to maintain or have access to information associated with the user, assistant module 122B may maintain user information at data store 124B that includes information about upcoming travel plans for the user of computing device 110. The travel plans may indicate that the user has booked a seat on a particular flight that was originally scheduled to depart in approximately twelve hours from a current time. An agent executing at assistant module 122B may be configured to obtain updates associated with the travel plans from search server system 180. For example, the agent of assistant module 122B may send a query to search module 182 for status information about the particular flight and in response, the agent of assistant module 122B may receive information indicating that the particular flight is delayed thirty minutes from its originally scheduled departure time.

Search module 182 may conduct a search (e.g., an internet search) for information (e.g., weather or traffic conditions, news, stock prices, sports scores, user schedules, transportation schedules, retail prices, etc.) related to a search query from amongst from a variety of information sources (e.g., either stored locally or remote to search server system 180). After executing a search, search module 182 may output the information returned from the search (e.g., search results, links to search results, etc.) to digital assistant server 160 or computing devices 110. Search module 182 may execute a search for information determined to be relevant to a search query generated by search module 182 (e.g., based on contextual information associated with computing device 110A). Search module 182 may execute a search based on a search query that search module 182 receives from digital assistant server 160 or computing device 110A (e.g., as part of a task that a virtual assistant is completing on behalf of a user of computing devices 110).

Assistant module 122B may determine that the flight delay is an event for initiating an interaction with a user of computing devices 110. Assistant module 122B may send information to assistant module 122A for triggering a notification of the event.

In response to receiving the event trigger from assistant module 122B, assistant module 122A may select, based on the event and from a plurality of actions that assistant module 122A is configured to perform, at least one action associated with or related to the event. For instance, assistant module 122A may be configured to perform a plurality of actions that include, but are not limited to: scheduling of services (e.g., transportation, home or auto related repair/maintenance, food delivery, pet sitting, pet walking, house sitting, babysitting, delivery, travel reservations, and any or all other services), exchanging communications (e.g., calendar invites, e-mail messages, text-based messages, social media network messages, telephone or video calls, and any or all other communications), procuring goods (e.g., online shopping, flower delivery, purchasing event tickets, and any or all other procurement related actions), amongst other actions. Assistant module 122A may rely on other applications or agents executing at or accessible by computing device 110A to perform the plurality of actions. Assistant module 122A may rely on other applications or agents executing at or accessible from computing device 110A to perform the plurality of actions.

Assistant module 122A may select any one or more of the plurality of actions as being related to the event. For example, assistant module 122A may score its capabilities or actions for a particular type of event based on feedback obtained regarding which types of actions that other assistants execute on behalf of users of other computing devices for the particular type of event. Assistant module 122A may score each of the plurality of actions and select one or more of the higher scoring actions as possibly being related to the event. For example, based on information stored at data store 124A, assistant module 122A may determine that in addition to the flight booking, the user has also reserved ground transportation at the final destination of the flight. Assistant module 122A may determine, based on how other users interact with other assistants, that the act of scheduling or re-scheduling ground transportation is an action typically performed by an assistant that is related to a flight delay event.

Not all events may be worthwhile events for notifying a user. Therefore, before outputting a notification of an event at the current time, assistant module 122A may determine whether to output the notification of an event. Assistant module 122A may restrict notifications of certain events or tailor notification of certain events to specific contexts to ensure that a user will find value in the notification. As one example, assistant module 122A may determine whether to output a notification of an event based at least in part on a combination of how recently a previous interaction occurred between the user and the assistant and a frequency of previous interactions between the user and the assistant.

For example, based on information stored in user information data store 124A, assistant module 122A may determine that when the user is awake, the user interacts with the assistant, on average, at threshold intervals or at a threshold frequency (e.g., approximately once an hour each day). Assistant module 122A may determine that since the last conversation between the user and the assistant occurred less than the threshold interval prior to the current time (e.g., only fifteen minutes ago) to refrain from outputting a notification of a half hour flight delay for a flight that is not scheduled to depart for another twelve hours or more. In some examples, assistant module 122A may determine, because the last conversation between the user and the assistant occurred greater than or equal the threshold interval prior to the current time (e.g., one hour ago), to output the notification of the half hour flight delay for the flight that is not scheduled to depart for another twelve hours or more.

Responsive to determining to output the notification of the event, assistant module 122A may output the notification of the event. The notification may include an indication of the event and a request to perform the at least one action selected above that is associated with the event. For example, assistant module 122B may send the notification of the event to assistant module 122A for output, via UIC 212, during an interaction between the user and the assistant. Assistant module 122A may output the notification as part of user interface 114 and include a portion of the text of the conversation shown in FIG. 1. Assistant module 122A may cause the notification to include an indication of a request to perform one or more actions related to the event, on behalf of the user. For instance, the indication of the event may correspond to displayed or spoken text "Your flight tonight to Topeka was cancelled due to bad weather" and the indication of the request to perform the at least one action may correspond to displayed or spoken text "Would you like me to reschedule the ground transportation you had reserved?".

In an effort to prevent inadvertent outputting of personal or sensitive information, assistant module 122A may cause a signaling of a notification without actually outputting the notification. For example, in response to receiving a notification from assistant module 122B, assistant module 122A may cause UIC 112 to output an alert to indicate that the assistant has information for the user. The alert may correspond to the text "I have something for you. Are you here?" shown in user interface 114. The output by UIC 112 may proactively signal the user that meaningful information is available.

In some examples, assistant modules 122 may refrain from outputting a notification until assistant modules 122 determine that a user has received and consented to such a signaling. For instance, assistant module 122B may determine that the user has consented to a conversation when assistant module 122A receives an indication of consent from the user (e.g., a microphone of UIC 112 determining an utterance indicating "Yes, I'm here"), receives an indication that the user has activated a display of UIC 112, and/or receives data indicating that the user has interacted with computing device 110A in some other way (e.g., lifting the device, pressing a button, etc.) to indicate consent.

In any case, after outputting the notification of the event and the request to perform the at least one action, assistant module 122A may detect user input as the user responds to the request. In the example of FIG. 1, assistant modules 122A may receive via a camera or a microphone of UIC 112 spoken or signed user input corresponding to text "Yes, please reschedule my ride." In response to determining that the spoken or signed user input corresponds to an affirmation of the request, an agent of assistant module 122A may reschedule the ground transportation reservation to accommodate the flight delay.

In some examples, an action may be associated with a third device that is different than a device executing either of assistant modules 122. Assistant modules 122A may perform or execute an action by sending information to the third device to cause the third device to complete the action. For example, the ground transportation service may be associated with an application executing at computing device 110B. Assistant module 122A may send, via network 130, a message to the application with a request to reschedule the service. Computing device 110B may output, in response to the application confirming that the ground transportation has been scheduled, a notification indicating the new time of the ground transportation.

In this way, assistant modules 122 may proactively direct the user to additional actions or capabilities of the assistant without necessarily inundating the user with trivial information or requiring the user to provide inputs related to such actions or capabilities. Because the example assistant proactively directs the user to meaningful information, the user need not spend time directing the assistant using specific inquiries. An example assistant according to the present disclosure may therefore complete tasks more quickly and/or respond to a user faster than other assistants. By proactively directing the user to meaningful information, the assistant may seem natural, less awkward, and more desirable to the user.

Among the several benefits provided by the aforementioned approach are: (1) the processing complexity and time for a device to act may be reduced by proactively directing the user to actions or capabilities of the assistant rather than relying on specific inquiries from the user or for the user to spend time learning the actions or capabilities via documentation or other ways; (2) meaningful information and information associated with the user may be stored locally reducing the need for complex and memory-consuming transmission security protocols on the user's device for the private data; (3) because the example assistant directs the user to actions or capabilities, fewer specific inquiries may be requested by the user, thereby reducing demands on a user device for query rewriting and other computationally complex data retrieval; and (4) network usage may be reduced as the data that the assistant module needs to respond to specific inquiries may be reduced as a quantity of specific inquires is reduced.

Figure 2:
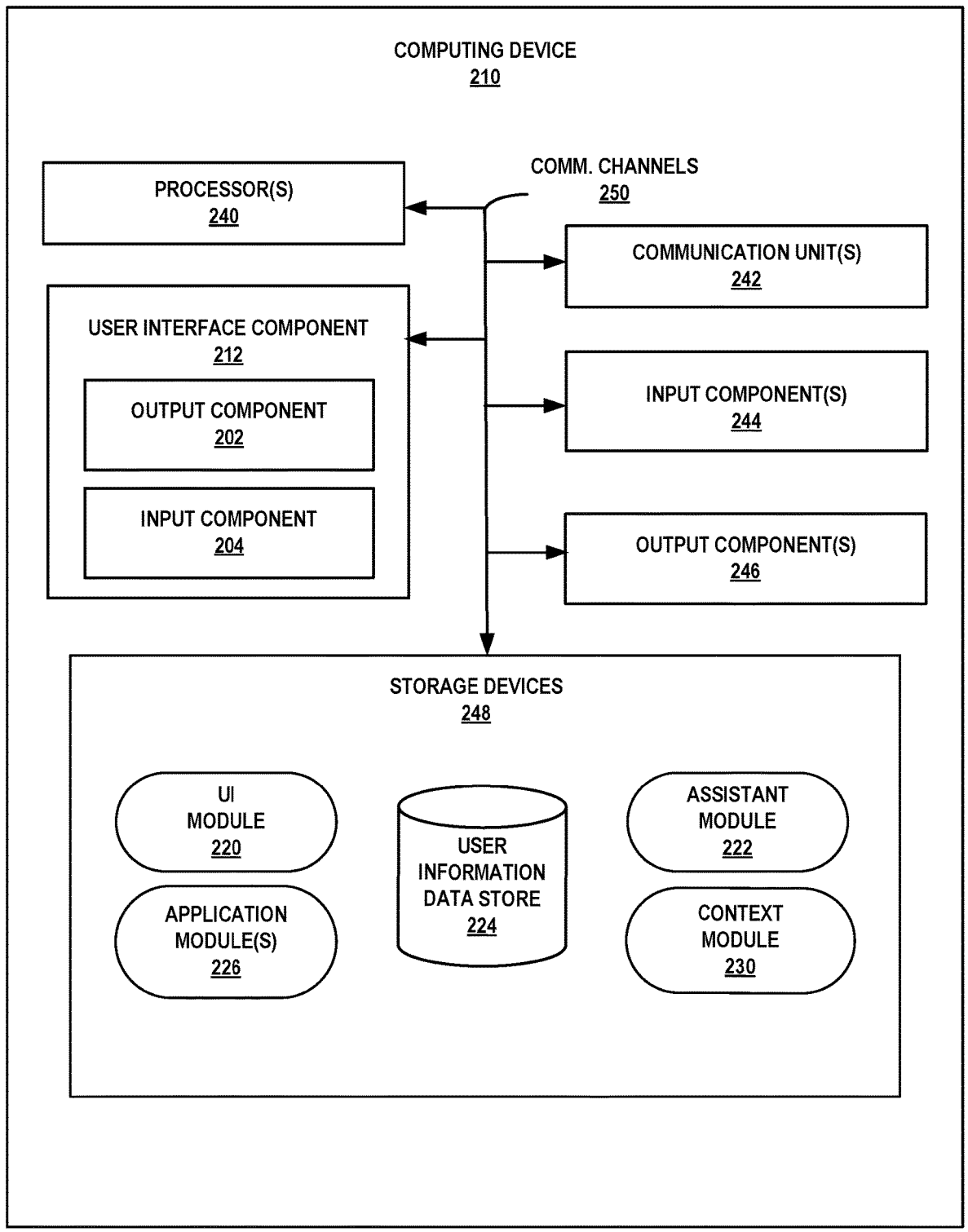
FIG. 2 is a block diagram illustrating an example computing device that is configured to execute an example virtual assistant, in accordance with one or more aspects of the present disclosure.

FIG. 2 is a block diagram illustrating an example computing device that is configured to execute an example virtual assistant, in accordance with one or more aspects of the present disclosure. Computing device 210 of FIG. 2 is described below as an example of computing device 110A and/or 110B of FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes user interface component (UIC) 212, one or more processors 240, one or more communication units 242, one or more input components 244, one or more output components 246, and one or more storage components 248. UIC 212 includes output component 202 and input component 204. Storage components 248 of computing device 210 include UI module 220, assistant module 222, user information data store 224, one or more application modules 226, and context module 230.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a global positioning satellite (GPS) receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 242 of computing device 210, in one example, includes a presence-sensitive input device (e.g., a touch sensitive screen, a PSD), mouse, keyboard, voice responsive system, video camera, microphone or any other type of device for detecting input from a human or machine. In some examples, input components 242 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output components 246 of computing device 110 may generate output. Examples of output are tactile, audio, and video output. Output components 246 of computing device 210, in one example, includes a PSD, sound card, video graphics adapter card, speaker, cathode ray tube (CRT) monitor, liquid crystal display (LCD), or any other type of device for generating output to a human or machine.

UIC 212 of computing device 210 may be similar to UIC 112 of computing device 110 and includes output component 202 and input component 204. Output component 202 may be a display component, such as a screen at which information is displayed by UIC 212 and input component 204 may be a presence-sensitive input component that detects an object at and/or near display component 202. Output component 202 and input component 204 may be a speaker and microphone pair or any other combination of one or more input and output components, such as input components 244 and output components 244. In the example of FIG. 2, UIC 212 may present a user interface (such as user interface 114 of FIG. 1).

While illustrated as an internal component of computing device 210, UIC 212 may also represent an external component that shares a data path with computing device 210 for transmitting and/or receiving input and output. For instance, in one example, UIC 212 represents a built-in component of computing device 210 located within and physically connected to the external packaging of computing device 210 (e.g., a screen on a mobile phone). In another example, UIC 212 represents an external component of computing device 210 located outside and physically separated from the packaging or housing of computing device 210 (e.g., a monitor, a projector, etc. that shares a wired and/or wireless data path with computing device 210).

One or more storage components 248 within computing device 210 may store information for processing during operation of computing device 210 (e.g., computing device 210 may store data accessed by modules 220, 222, 230, and 226, and data store 224 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 in some examples include one or more non-transitory computer-readable storage mediums. Storage components 248 may be configured to store larger amounts of information than typically stored by volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220, 222, 230, and 226, and data store 224. Storage components 248 may include a memory configured to store data or other information associated with modules 220, 222, 230, and 226, and data store 224.

One or more processors 240 may implement functionality and/or execute instructions associated with computing device 210. Examples of processors 240 include application processors, display controllers, auxiliary processors, one or more sensor hubs, and any other hardware configure to function as a processor, a processing unit, or a processing device. Modules 220, 222, 230, and 226 may be operable by processors 240 to perform various actions, operations, or functions of computing device 210. For example, processors 240 of computing device 210 may retrieve and execute instructions stored by storage components 248 that cause processors 240 to perform the operations modules 220, 222, 230, and 226. The instructions, when executed by processors 240, may cause computing device 210 to store information within storage components 248, for example, at data stores 224.

UI module 220 may include all functionality UI module 120 of FIG. 1 and may perform similar operations as UI module 120 for executing an assistant as part of computing device 210. UI module 220 may manage user interactions with UIC 212 and other components of computing device 210. UI module 220 may cause UIC 212 to output a user interface as a user of computing device 210 views output and/or provides input at UIC 212.

User information data store 224 is an example of user information data store 124A of FIG. 1. Assistant module 222 may include all functionality of assistant modules 122 of FIG. 1 and may perform similar operations as assistant modules 122 for executing an assistant as part of computing device 210 and maintaining and accessing user information at user information data store 224. In some examples, assistant module 222 may execute locally (e.g., at processors 240) to provide assistant functions. In some examples, assistant module 222 may act as an interface to a remote assistant service accessible to computing device 210. For example, assistant module 222 may be an interface or application programming interface (API) to assistant module 122B of digital assistant server 160 of FIG. 1.

One or more application modules 226 represent all the various individual applications and services executing at and accessible from computing device 210 that may be accessed by an assistant to provide user with information and/or perform a task or action. Numerous examples of application modules 226 may exist and include, a fitness application, a calendar application, a search application, a map or navigation application, a travel application (e.g., planning, reservation, ticketing, etc.), a social media application, a game application, an e-mail application, a chat or messaging application, an Internet browser application, or any other applications that may execute at computing device 210. An assistant executing at computing device 210, such as assistant module 222, may cause applications 226 to execute instructions for performing a plurality of actions associated with the assistant. In other words, the assistant may rely on application modules 226 to perform a plurality of actions on behalf of the assistant.

After receiving explicit consent from a user to store and make use of personal information (e.g., information stored at data store 224), context module 230 may process and analyze contextual information associated with computing device 210 to define a context of computing device 210 or a context of a user of computing device 210. Context module 230 may encrypt or otherwise treat the information being analyzed and/or stored to remove the actual identity of the user before storing or making use of the personal. For example, the information may be treated by context module 230 so that any personally-identifiable information is removed when stored or sent to a remote computing device (e.g., digital assistant server 160) for processing. Context module 230 may only analyze information associated with computing device 210 and/or a user of computing device 210 if the user affirmatively consents to use or collection of such information. Context module 230 may further provide opportunities for the user to withdraw consent and in which case, context module 230 may cease collecting or otherwise retaining the information associated with computing devices 210 or the user of computing devices 210.

A context of computing device 210 may specify one or more characteristics associated with computing device 210 and/or the user of computing device 210 and his or her physical and/or virtual environment at various locations and times. For example, context module 230 may determine, as part of a context of computing device 210, a physical location associated with computing device 210 at a particular time based on the contextual information associated with computing device 210 from that particular time. As the contextual information changes (e.g., based on sensor information indicative of movement over time), context module 230 may update the physical location in the determined context of computing device 210.

The types of information that define a context of a computing device for a particular location and/or time are too numerous to list. As some examples, a context of a computing device may specify: an acoustic fingerprint, a video fingerprint, a location, a movement trajectory, a direction, a speed, a name of an establishment, a street address, a type of place, a building, weather conditions, and traffic conditions, at various locations and times. The context of the computing device may further include calendar information that defines a meeting or an event associated with various locations and times, webpage addresses viewed at various locations and times, text entries made in data fields of the webpages viewed at various locations and times (e.g., search or browsing histories), and other application usage data associated with various locations and times. The context of the computing device may further include information about audio and/or video streams accessed by or being broadcast in the presence of the computing device at various locations and times, television or cable/satellite broadcasts accessed by or being broadcast in the presence the computing device at various locations and times, and information about other services accessed by the computing device at various locations and times.

Context module 230 may share the context of computing device 210 with assistant module 222 from which assistant module 222 may determine whether to output a notification of an event. Context module 230 may respond to a request from assistant module 222 for a current context or current state associated with computing device 210, by outputting data to assistant module 222 that specifies the current state or context of the user.

In operation, assistant module 222 may determine, based on information associated with a user of the computing device, an event for initiating an interaction between the user and the assistant. For example, assistant module 222 may monitor data sources, such as data store 224, to detect changes to information that that might signify an event worth notifying a user. Examples of data sources include message accounts, calendars, social media accounts, and other information sources. Examples of events include appointment additions, cancellations or changes (e.g., invitations, meetings, anniversaries, etc.), occurrences (e.g., shipping notifications, flight delays), announcements (e.g., tour dates, etc.), and other types of events.

Data store 224 may include a reference to a private or public calendar. Assistant module 222 may detect events related to the calendar when an appointment on the calendar is added, deleted, modified, satisfied, or missed. For example, assistant module 222 may determine an event in response to determining, based on a private calendar, that a dentist sent a cancellation notice to cancel an appointment on the calendar. Assistant module 222 may determine an event in response to determining, based on a public calendar, that a holiday, birthday, or anniversary is approaching.

Data store 224 may include references to e-mail or text messages, voice messaged, video messages, and the like. Assistant module 222 may determine events based on information included in such communications. For example, assistant module 222 may determine an event in response to determining, based on an e-mail from a service provider (e.g., an airline, a cable provider, etc.) that a scheduled appointment has been canceled or delayed. Or, assistant module 222 may determine an event in response to determining, based on an e-mail from a retailer, that a package has shipped.

Assistant module 222 may select, based on the event and from the plurality of actions, at least one action associated with the event. For example, a model of assistant module 222 may receive as input, an event or event type and output one or more actions associated with the event. The model may be a machine learning type model (e.g., a neural network), a rule based model, or other type of model that matches actions to events.

The model may assign a degree of likelihood (e.g., a score, a probability, etc.) indicating how close a relationship that an action has to an event and/or that the action can be performed in relation to the event. For example, the model may be trained on observations of user activity with regard to various events and actions the users cause computing devices to perform in response to the events. With explicit consent from users, the model may analyze user device interactions to develop rules that indicate, for a specific event or event type, what actions the user will want to take and when such actions should be taken.

For example, the model may be trained on user interaction data indicating that ninety percent of the time a user receives a flight delay notification the user sends a message to a close contact. The model may be further trained on user interaction data indicating that eighty percent of the time the user causes the device to send a message, the message is sent to a spouse or significant other. Therefore, the model may create a rule that indicates whenever a flight delay notification is to be output, an action worth recommending might be an action to send a message to a spouse or significant other.

As another example, the model may be trained on user interaction data indicating that a majority of users of other devices check fantasy sports scores after receiving a scoring update for a game currently in progress. The model may be further trained on user interaction data indicating that eighty percent of the time the user causes the device to open a popular fantasy sports application as the primary way that the users check the fantasy scores. Therefore, the model may create a rule that indicates whenever a sports score notification is to be output, and the popular fantasy sports application is installed on a computing device, an action worth recommending might be an action to launch the fantasy sports application after showing the score.

In some cases, the model may be based on a dependency graph. For example, the dependency graph of the model may include a root node that may be a flight. Depending from the root node may be a transportation node, a lodging node, a meeting node, a meal node, etc. The edges between the root node and each of these nodes can be the dependencies, such as arrival time, available reservations, etc. If an edge cannot be traversed, then the model may trigger an action to be suggested. In some examples, the suggested actions may themselves be nodes of a dependency graph, with various dependencies (e.g., how late, not alternative, etc.) and weights, and the highest weighted possible path may be offered to the user (and alternative, lower weighted actions can also be offered if appropriate). The graphs of the model may be presented initially as templates to which user data may be added, and that can be modified (e.g., using machine learning, manual input from a user, etc.). by the system. Many other examples of the model exist.

In any case, as assistant module 222 generates such rules, the input to a rule may be an event or event type and the output of each rule may indicate a degree of likelihood that each available action is associated with the particular event. Assistant module 222 may rank the plurality of actions it may perform based on the degree of likelihood assigned to each action to determine a highest-ranking action or actions. In other words, assistant module 222 may rank, based on the event, each of the plurality of actions, and select the at least one action with a highest ranking.

In some examples, if the degree of likelihood of all the actions does not satisfy a threshold, assistant module 222 may determine that there are no actions related to an event. For example, if none of the plurality of actions that may be performed by assistant module 222 has a greater than fifty percent degree of likelihood of being associated with a particular event, assistant module 222 may determine that there are no actions worthy of suggesting during a notification of the particular event.

In some examples, if the degree of likelihood of a single action satisfies the threshold, assistant module 222 may determine that there is a single action related to an event. For example, if only one of the plurality of actions that may be performed by assistant module 222 has a greater than ninety percent degree of likelihood of being associated with a particular event, assistant module 222 may determine that there is a single action worthy of suggesting during a notification of the particular event.

In some examples, if the degree of likelihood of two or more actions satisfies the threshold, assistant module 222 may determine that there are multiple actions related to an event. For example, if two or more of the plurality of actions that may be performed by assistant module 222 each has a greater than ninety five percent degree of likelihood of being associated with a particular event, assistant module 222 may determine that there are multiple actions worthy of suggesting during a notification of the particular event.

In some examples, the model used by assistant module 222 to select, based on the event and from the plurality of actions, at least one action associated with the event may be table or graph based. For example, assistant module 222 may look up an event or event type at the table or graph and determine which one or more actions linked to the event are included in the table or graph.

Some assistants may provide a voice-only interface, may come with little documentation, or may otherwise be limited in ways to teach a user what the assistant can do. Discovering actions or capabilities of an assistant may be difficult for some users. Assistant modules 222 may be configured to teach a user about its capabilities at times when an action or capability may be helpful or otherwise beneficial to the user. Assistant module 222 may determine whether to output a notification of an event that includes a suggested action so as to improve a likelihood that not only will the notification be of interest, but also so that the recommended action suggested by the assistant will likely be authorized by the user. In this way, assistant module 222 may suggest truly useful actions where the likelihood that the user may decline the suggestion is low. Even if the user does not authorize an action, assistant module 222 will have taught the user a new action.

For example, assistant module 222 may determine whether to output the notification of the event based at least in part on a degree of likelihood that the user will accept the request to perform an action associated with the event. Assistant module 222 may determine the degree of likelihood based on context of the user, context of computing device 222, information stored at user information data store 224, or a combination thereof, and any other information accessible to assistant module 222.

For example, assistant module 222 may determine whether to output the notification of the event based at least in part on how recently a previous interaction occurred between the user and the assistant. If a previous interaction occurred within a threshold period of time (e.g., five minutes), assistant module 222 may determine that the degree of likelihood is low that the user will accept the request to perform the action and instead may be more likely to dismiss the request. If the previous interaction occurred outside the threshold period of time, assistant module 222 may determine that the degree of likelihood is high that the user will accept the request to perform the action and therefore may be more likely to accept the request.

Assistant module 222 may determine whether to output the notification of the event based at least in part on a context of computing device 210. For instance, if the context indicates that the user is interacting with computing device 210 (e.g., looking at UIC 212 and/or providing inputs to UIC 212), assistant module 222 may determine that the degree of likelihood is high that the user will accept the request to perform the action and therefore may be more likely to accept the request. If the context indicates that the user is not interacting with computing device 210 (e.g., computing device 210 is coupled to a wireless communication unit of a moving vehicle, computing device 210 is lying flat on a table or in a user's pocket, computing device 210 is located in a movie theatre, etc.), assistant module 222 may determine that the degree of likelihood is low that the user will accept the request to perform the action and therefore may be more likely to not output the notification with the request.

In some examples, assistant module 222 may assign a severity level to an event and increase or decrease, based on the severity level, the degree of likelihood that the user will accept the request to perform the action. For example, if an event is that a flight is delayed less than a threshold amount of time (e.g., one hour, one half hour, etc.), assistant module 222 may determine that such an event is not a severe event based on a determination that a severity level of the event is low. However, if the flight is delayed more than or equal to the threshold amount of time (e.g., one hour, one half hour, etc.), assistant module 222 may determine that such an event is a severe event based on a determination that a severity level of the event is a medium or high level.

In some examples, the threshold amount of time may be based on the actual event. For example, the threshold amount of time may be a percentage of the total flight time (i.e., duration of the flight itself). If a flight is delayed by a hour however the flight is ten hours, assistant module 222 may assign a low or medium severity level. Whereas if a flight is delayed by half hour and the flight is only an hour, then assistant module 222 may assign a high severity level to the event so that a notification including a suggested action (e.g., notifying a friend or spouse of a late arrival home) is more likely to be output at a current time.

Responsive to determining to output a notification of the event, assistant module 222 may output, via UIC 212, the notification of the event during the interaction between the user and the assistant. The notification may include an indication of the event and a request to perform the at least one action associated with the event.

For example, if assistant module 222 determines that a dentist appointment on a calendar is canceled (e.g., by way of an email or notification pushed to a user), assistant module 222 may determine to output a notification of the cancellation. The output may be a voice-notification that includes a request to call the dentist to reschedule. In response to receiving user input at UIC 212 indicating that the user wants the assistant to call the dentist, assistant module 222 may invoke a phone application from application modules 226 to dial the dentist office on the user's behalf.

As another example, if assistant module 222 determines that a flight is delayed five hours, assistant module 222 may determine to output a notification of the cancellation. The output may be a voice-notification that includes a request to cancel ground transportation reserved at the destination. In response to receiving user input at UIC 212 indicating that the user wants the assistant to cancel the ground transportation, assistant module 222 may send a message to the ground transportation service that cancels the reservation.

As another example, that a flight is delayed five hours, assistant module 222 may determine to output a notification of the cancellation. The output may be a voice-notification that includes a request to telephone, text message, e-mail, or otherwise contact the user's wife. In response to receiving user input at UIC 212 indicating that the user wants the assistant to contact the user's wife, assistant module 222 may determine the contact information for the user's wife and send a message to the wife informing her of the delay.

As another example, if assistant module 222 determines that Valentine's Day is in less than one week, assistant module 222 may determine to output a notification of the event. The output may be a voice-notification that includes a request to order flowers for the user's girlfriend. In response to receiving user input at UIC 212 indicating that the user wants the assistant to order flowers, assistant module 222 may determine the contact information for the user's girlfriend and place an online order for flower delivery to the girlfriend's address.

In this way, assistant module 222 may improve discoverability of features, capabilities, or actions that assistant module 222 can perform so that a user of computing device 210 may get more benefit or usage out of existing features. Assistant module 222 teaches actions in grammar in a native language of the user. In some examples, multiple actions are suggested with a notification or a single action is suggested. In response to receiving confirmation that the user wishes the assistant to take an action, assistant module 222 may perform the action and/or direct the user to a companion application, such as one of application modules 226, from which the action can be performed.

Figure 3:
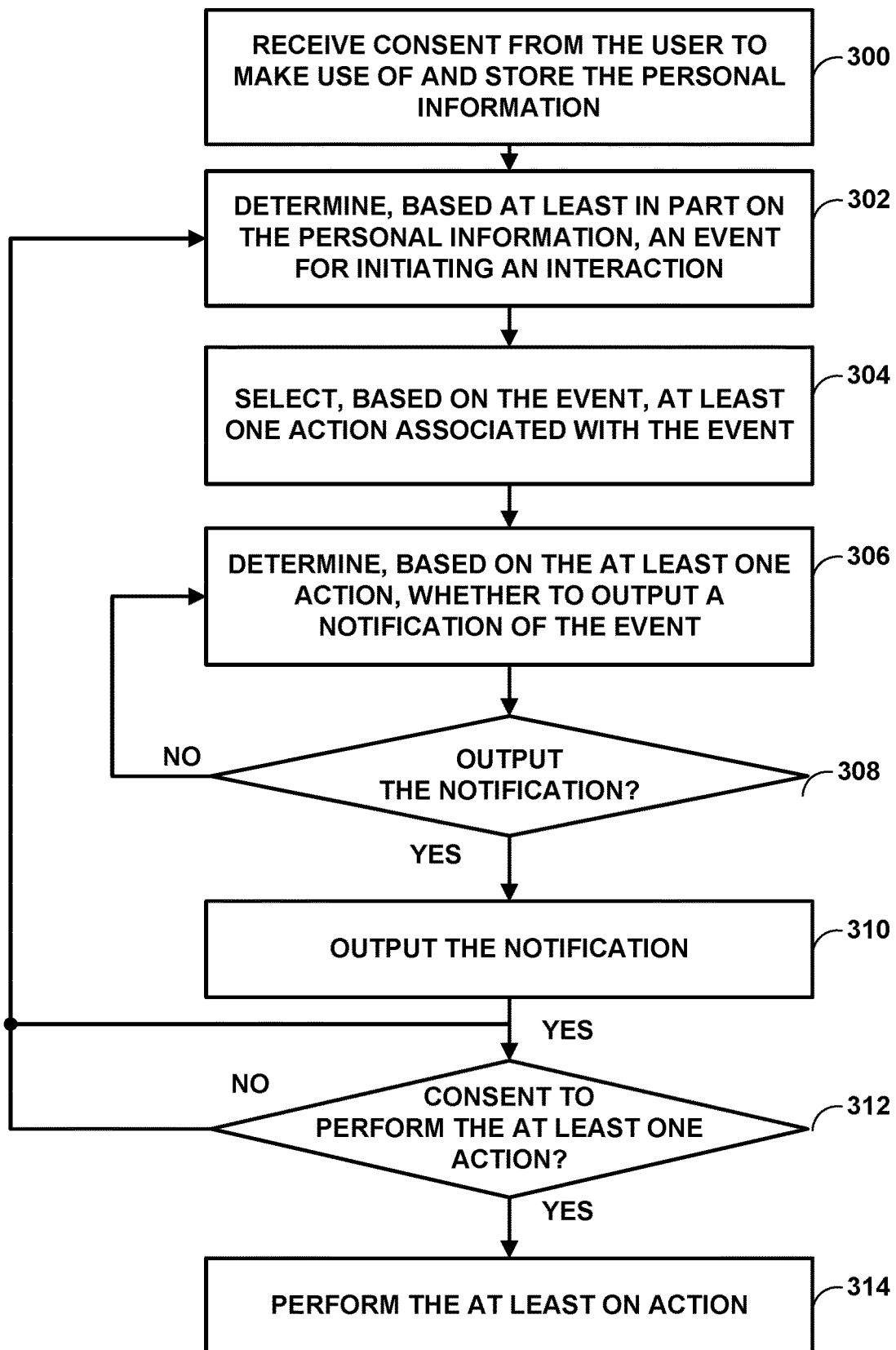
FIG. 3 is a flowchart illustrating example operations performed by one or more processors executing an example virtual assistant, in accordance with one or more aspects of the present disclosure.

FIG. 3 is a flowchart illustrating example operations performed by one or more processors executing an example virtual assistant, in accordance with one or more aspects of the present disclosure. FIG. 3 is described below in the context of computing device 110 of FIG. 1. For example, assistant module 122A, while executing at one or more processors of computing device 110A, may perform operations 300-308, in accordance with one or more aspects of the present disclosure.

In operation, computing device 110A may receive consent from a user to make use of and store the personal information (300). For instance, in response to identifying potential personal information, assistant module 122A may cause UI module 120 to request permission from the user to store and make use of personal information obtained during interactions with assistant module 122A and the user. It should be understood that computing device 110A may not require a user to consent prior to each time that assistant module 122A wants to make use of or store personal information. For example, if computing devices 110A receives consent once a year, once a day, or even just one time (e.g., after initial product purchase, set up, etc.) computing device 110A may treat that prior consent as consent to make use and store personal information in the future. As one example of how a user may provide consent, the user may provide a voice input "yeah that's ok to store information about me" detected by UIC 112 and in response to the voice input, assistant module 122A may begin maintaining personal records about the user at data store 122A.

Computing device 110A may determine, based at least in part on the personal information, an event for initiating an interaction (302). For example, assistant module 122A may receive a notification (e.g., data) from digital assistant server 160 that is indicative of an event for initiating an interaction between the user of computing device 110A and the assistant. The notification may include a message received by a message account of the user from a friend. The message may include a question asking the user if he or she would like to go to happy hour.

Computing device 110A may select, based on the event, at least one action associated with the event (304). For example, a model of assistant module 122A may determine that a happy hour is a late arrival type of event and therefore sending a message home to let the family know of a late arrival is an action associated with happy hour. Additionally, the model of assistant module 122A may determine that recording a live news broadcast that the user typically watches after work is an action associated with happy hour.

Computing device 110A may determine, based on the at least one action, whether to output a notification of the event (306). For example, assistant module 122A may refrain from generating a notification of the event until a context of computing device 110A (e.g., a time) when assistant module 122A thinks that the user is most likely to want the assistant to perform the at least one action. Assistant module 122A may determine, based on contextual information about computing device 110A, that the user is located in a conference room for a meeting that is about to start. Assistant module 122A may determine that the happy hour event is a low severity level event and because it is unlikely that the user will want the assistant to perform the action now, that rather than output a notification of the event, assistant module 122A should refrain from outputting the notification until a later time (308, NO).

At a later time, e.g., after the meeting, assistant module 122A may determine, based on contextual information about computing device 110A, that the user is located in his or her office. Assistant module 122A may determine that despite the happy hour event being a low severity level event and it is more likely that the user will want the assistant to perform the action now while the user is alone in his or her office. Therefore, assistant module 122A may determine that the current time is a good time to generate the notification of the event (308, YES).

Computing device 110A may output the notification (310). For example, assistant module 122A may determine that the user is interacting with computing device 110B (e.g., a laptop) while in his or her office. Computing device 110A may send a notification of the happy hour including recommendations for both: sending a message home to let the family know of a late arrival, and recording a live news broadcast that the user typically watches after work. Computing device 110B may display a graphical indication of the notification alerting the user to the happy hour invitation along with selectable buttons for the user to select whether to have the assistant send a message home and/or record the news on the home digital video recorder.

After outputting the notification (310), computing device 110A may receive data from computing device 110B indicating that the user has consented to assistant module 122A performing one or both of the actions suggested with the event notification (312). For example, computing device 110B may share an indication of a voice command received from a user indicating the user wants the assistant to send the message home and/or record the news.

Response to receiving the user input, assistant module 122A may perform the actions consented to by the user (314). For example, assistant module 122A may invoke an application executing at the at least one processor that is configured to perform the action, the application being different than the assistant. For example, to send the message home, assistant module 122A may send data to a messaging application that sends a message to the user's family via the user's messaging account.

In some examples, assistant module 122A may perform the action. For example, to control the digital video recorder, assistant module 122A may send data to an API of a remote control application configured to control the digital video recorder. Assistant module 122A may directly configure the recorder to record the news broadcast by sending inputs to API.

Figure 4:
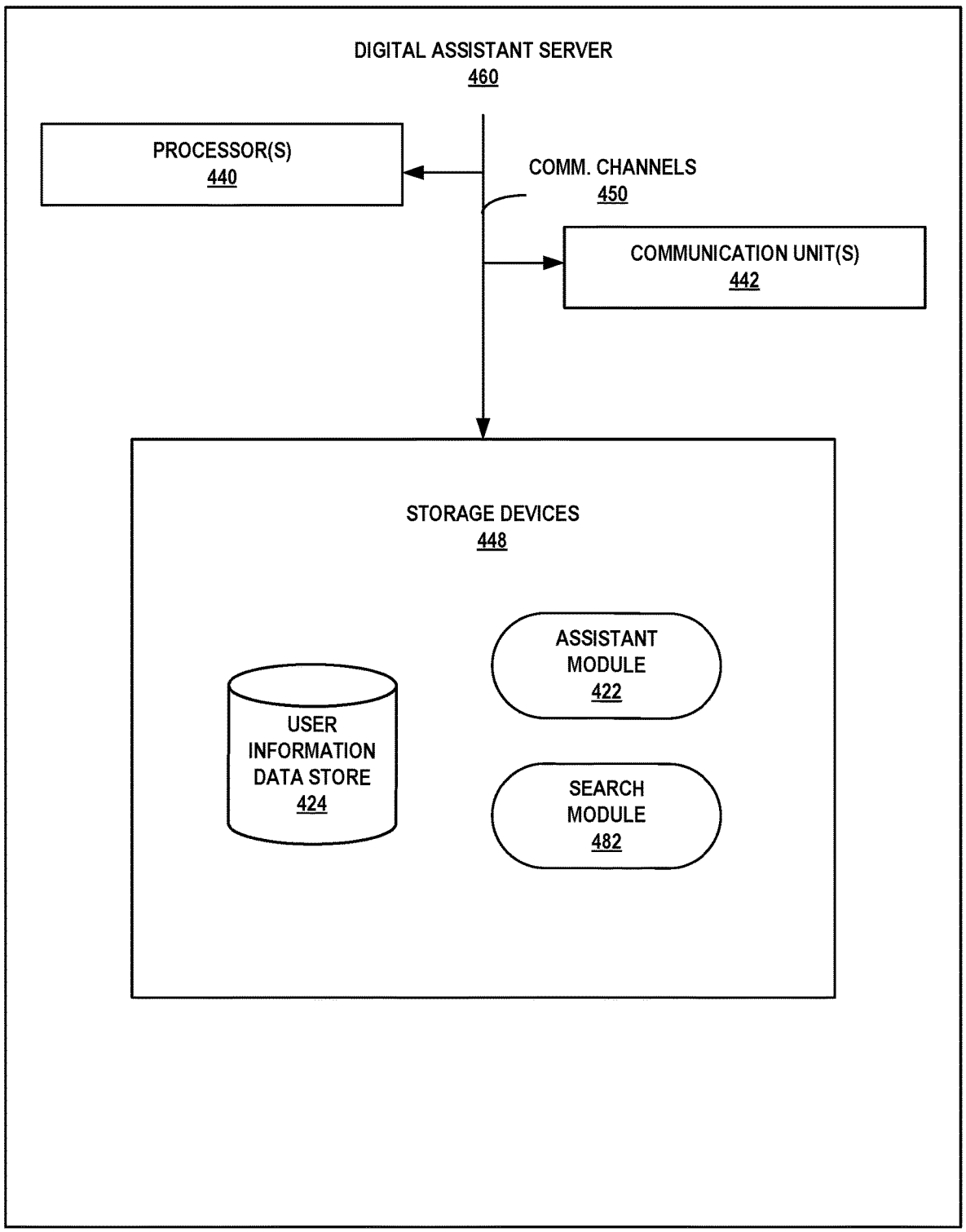
FIG. 4 is a block diagram illustrating an example digital assistant server that is configured to execute an example virtual assistant, in accordance with one or more aspects of the present disclosure.

FIG. 4 is a block diagram illustrating an example computing system that is configured to execute an example virtual assistant, in accordance with one or more aspects of the present disclosure. Digital assistant server 460 of FIG. 4 is described below as an example of digital assistant server 160 of FIG. 1. FIG. 4 illustrates only one particular example of digital assistant server 460, and many other examples of digital assistant server 460 may be used in other instances and may include a subset of the components included in example digital assistant server 460 or may include additional components not shown in FIG. 4.

As shown in the example of FIG. 4, digital assistant server 460 includes one or more processors 440, one or more communication units 442, and one or more storage devices 448. Storage devices 448 include assistant module 422, user information data store 424, and search module 482.

Processors 440 are analogous to processors 240 of computing system 210 of FIG. 2. Communication units 442 are analogous to communication units 242 of computing system 210 of FIG. 2. Storage devices 448 are analogous to storage devices 248 of computing system 210 of FIG. 2. Communication channels 450 are analogous to communication channels 250 of computing system 210 of FIG. 2 and may therefore interconnect each of the components 440, 442, and 448 for inter-component communications. In some examples, communication channels 450 may include a system bus, a network connection, an inter-process communication data structure, or any other method for communicating data.

Search module 482 of digital assistant server 460 is analogous to search module 182 of search server system 180 and may perform integrated search functions on behalf of digital assistant server 460. That is, search module 482 may perform search operations on behalf of assistant module 422. In some examples, search module 482 may interface with external search systems, such as search system 180 to perform search operations on behalf of assistant module 422. When invoked, search module 482 may perform search functions, such as generating search queries and executing searches based on generated search queries across various local and remote information sources. Search module 482 may provide results of executed searches to the invoking component or module. That is, search module 482 may output search results to assistant module 422.

User information data store 424 is analogous to user information data store 224 of FIG. 2 and is configured to store information associated by the user that assistant module 422 has learned about the user of a computing device during conversations between the user and an assistant provided by assistant module 422. Assistant module 422 may rely on the information stored at data store 424, to determine events and select actions related to the events for inclusion in notifications sent by assistant module 422.

Assistant module 422 may include some or all functionality of assistant modules 122 of FIG. 1 and assistant module 222 of computing device 210 of FIG. 2. Assistant module 422 may perform similar operations as assistant modules 122 and 222 for providing an assistant service that is accessible via a network, such as network 130. That is, assistant module 422 may act as an interface to a remote assistant service accessible to a computing device that is communicating over a network with digital assistant server 460. For example, assistant module 422 may be an interface or API to assistant module 122B of digital assistant server 160 of FIG. 1.

In operation, assistant module 422 may analyze information contained at user information data store 424 as well as information received from search module 482 for events worth notifying a user. When assistant module 422 detects an event, and selects an action to recommend in relation to the event, assistant module 422 may choose to trigger a notification of the event based on a combination various factors, including how frequently assistant module 422 have started an interaction for a user and a likelihood of success for the interaction.

Assistant module 422 may generate a "surface-appropriate way" notification that is more likely to get the attention of the user. For example, if the user is associated with a home assistant device and has recently interacted with the home assistant, assistant module 422 may cause the home assistant to generate a voice-notification that is based on the vent. The voice-notification may be generated in the language of the home assistant device. For example, a voice-notification may be sent to the home device that causes the home device to generate audio (in a computer-generated voice) as "Hello Viki, your flight has been delayed by three hours. Should I cancel the limo reservation?" If the user is associated with a mobile phone and interacts with the assistant via the mobile phone, assistant module 422 may send the mobile phone a notification that is displayed graphically on a screen with a "cancel button" to cancel the limo reservation. In some cases, e.g., for high-value events or events with a high severity level, assistant module 422 may send a notification with actions to multiple surfaces simultaneously.

Clause 1. A method comprising: determining, based on information associated with a user of a computing device, an event for initiating an interaction between the user and an assistant executing at the computing device, wherein the assistant is configured to perform a plurality of actions; selecting, based on the event and from the plurality of actions, at least one action associated with the event; determining, based on the at least one action, whether to output a notification of the event, wherein the notification includes an indication of the event and a request to perform the at least one action associated with the event; and responsive to determining to output the notification of the event, sending, to the assistant, the notification of the event for output during the interaction between the user and the assistant.

Clause 2. The method of 1, further comprising: scoring, based on the event, each of the plurality of actions; and selecting, the at least one action with a respective scoring that satisfies a threshold.

Clause 3. The method of any one of clauses 1-2, wherein determining whether to output the notification of the event includes determining whether to output the notification of the event based at least in part on how recently a previous interaction occurred between the user and the assistant.

Clause 4. The method of any one of clauses 1-3 wherein determining whether to output the notification of the event includes: determining a degree of likelihood that the user will accept the request to perform the at least one action associated with the event; and determining whether to output the notification of the event based at least in part on the degree of likelihood that the user will accept the request to perform the at least one action associated with the event.

Clause 5. The method of clause 4, further comprising: determining a severity level of the event; and determining whether to output the notification of the event based further on the severity level of the event.

Clause 6. The method of any one of clauses 1-5, wherein determining whether to output the notification of the event includes determining whether to output the notification of the event based at least in part on a combination of how recently a previous interaction occurred between the user and the assistant and a frequency of previous interactions between the user and the assistant.

Clause 7. The method of any one of clauses 1-6, wherein the at least one action associated with the event is associated with an application configured to perform the at least one action, the application being different than the assistant.

Clause 8. The method of any one of clauses 1-7, wherein the at least one action is a single action.

Clause 9. The method of any one of clauses 1-8, wherein the at least one action includes multiple actions.

Clause 10. A computing device comprising: an output device; at least one processor; and at least one memory comprising instructions that when executed, cause the at least one processor to execute an assistant configured to: determine, based on information associated with a user of the computing device, an event for initiating an interaction between the user and the assistant, wherein the assistant is configured to perform a plurality of actions; select, based on the event and from the plurality of actions, at least one action associated with the event; determine, based on the at least one action, whether to output a notification of the event wherein the notification includes an indication of the event and a request to perform the at least one action associated with the event; and responsive to determining to output the notification of the event, output, via the output device, the notification of the event during the interaction between the user and the assistant.

Clause 11. The computing device of clause 10, further comprising an input device, wherein the assistant is further configured to: receive, via the input device, user input commanding the assistant to perform the at least one action; response to receiving the user input, perform the at least one action.

Clause 12. The computing device of any one of clauses 10-11, wherein the assistant is further configured to perform the at least one action by invoking an application executing at the at least one processor that is configured to perform the at least one action, the application being different than the assistant.

Clause 13. The computing device of any one of clauses 10-12, wherein the at least one action includes multiple actions.

Clause 14. The computing device of clause 13, further comprising an input device, wherein the assistant is further configured to: receive, via the input device, user input commanding the assistant to perform a particular action from the multiple actions; and response to receiving the user input, perform the particular action.

Clause 15. The computing device of any one of clauses 10-14, wherein the assistant is further configured to receive the event from a remote computing system that is configured to determine the event for initiating an interaction between the user and the assistant.

Clause 16. The computing device of any one of clauses 10-15, wherein the output device is configured to output audio and the notification is a voice notification.

Clause 17. A computer-readable storage medium comprising instructions that, when executed cause at least one processor of a digital assistant system to: determine, based on information associated with a user of a computing device, an event for initiating an interaction between the user and an assistant executing at the computing device, wherein the assistant is configured to perform a plurality of actions; select, based on the event and from the plurality of actions, at least one action associated with the event; determine, based on the at least one action, whether to output a notification of the event, wherein the notification includes an indication of the event and a request to perform the at least one action associated with the event; and responsive to determining to output the notification of the event, send, to the assistant, the notification of the event for output during the interaction between the user and the assistant.

Clause 18. The computer-readable storage medium of clause 17, wherein the instructions, when executed by the at least one processor, cause the digital assistant system to determine whether to output the notification of the event by at least determining whether to output the notification of the event based at least in part on how recently a previous interaction occurred between the user and the assistant.

Clause 19. The computer-readable storage medium of any one of clauses 17-18, wherein the instructions, when executed by the at least one processor, cause the digital assistant system to determine whether to output the notification of the event by at least: determining a degree of likelihood that the user will accept the request to perform the at least one action associated with the event; and determining whether to output the notification of the event based at least in part on the degree of likelihood that the user will accept the request to perform the at least one action associated with the event.

Clause 20. The computer-readable storage medium of any one of clauses 17-19, wherein the at least one action is associated with a third device that is different than the computing device and the digital assistant system.

Clause 21. A computing device comprising at least one processor and at least one memory comprising instructions that when executed, cause the at least one processor to perform the method of any one of clauses 1-9.

Clause 22. A computer-readable storage medium comprising instructions that, when executed cause at least one processor of a computing device to perform the method of any one of clauses 1-9.

Clause 23. A system comprising means for performing the method of any one of clauses 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable medium may include computer-readable storage media or mediums, which corresponds to a tangible medium such as data storage media, or communication media including any medium that facilitates transfer of a computer program from one place to another, e.g., according to a communication protocol. In this manner, computer-readable medium generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments have been described. These and other embodiments are within the scope of the following claims.

What is claimed is:

1. A method comprising:
   determining, based on information associated with a user of a computing device, an event for initiating an interaction between the user and an assistant module executing at the computing device, wherein the assistant module is configured to perform a plurality of actions;
   selecting, by the assistant module executing at the computing device and based on the event and from the plurality of actions, at least one action associated with the event, wherein selecting the at least one action associated with the event includes scoring each of the plurality of actions based on feedback regarding types of actions previously executed on behalf of other users of other computing devices for a particular type of event that corresponds to the event;

determining whether to output a notification of the event, wherein the notification includes an indication of the event and a request to perform the at least one action associated with the event, wherein determining whether to output the notification of the event is performed based on:

the at least one action that was selected, and context data of the computing device indicating a current level of user interaction with the computing device; and responsive to determining to output the notification of the event, sending, to the assistant module, the notification of the event for output during the interaction between the user and the assistant module.

2. The method of claim 1, wherein determining whether to output the notification of the event is performed further based on determining whether to output the notification of the event based at least in part on how recently a previous interaction occurred between the user and the assistant.

3. The method of claim 1, wherein determining whether to output the notification of the event is performed further based on:

a degree of likelihood that the user will accept the request to perform the at least one action associated with the event.

4. The method of claim 3, wherein determining whether to output the notification of the event is further based on:

a severity level of the event.

5. The method of claim 1, wherein determining whether to output the notification of the event is performed further based at least in part on a combination of how recently a previous interaction occurred between the user and the assistant and a frequency of previous interactions between the user and the assistant.

6. The method of claim 1, wherein the at least one action associated with the event is associated with an application configured to perform the at least one action, the application being different than the assistant.

7. The method of claim 1, wherein the at least one action is a single action.

8. The method of claim 1, wherein the at least one action includes multiple actions.

\* \* \* \* \*